(12) United States Patent
Nomaru et al.

(10) Patent No.: US 9,802,270 B2
(45) Date of Patent: Oct. 31, 2017

(54) LASER MACHINING APPARATUS

(71) Applicant: DISCO CORPORATION, Tokyo (JP)

(72) Inventors: Keiji Nomaru, Tokyo (JP); Koichi Katayama, Tokyo (JP)

(73) Assignee: Disco Corporation, Tokyo (JP)

( * ) Notice: Subject to any disclaimer, the term of this patent is extended or adjusted under 35 U.S.C. 154(b) by 242 days.

(21) Appl. No.: 14/840,338

(22) Filed: Aug. 31, 2015

(65) Prior Publication Data

US 2016/0067823 A1    Mar. 10, 2016

(30) Foreign Application Priority Data

Sep. 4, 2014   (JP) .................................. 2014-179918

(51) Int. Cl.

| | |
|---|---|
| *B23K 26/067* | (2006.01) |
| *B23K 26/364* | (2014.01) |
| *B23K 26/402* | (2014.01) |
| *H01L 21/687* | (2006.01) |
| *B23K 103/00* | (2006.01) |

(52) U.S. Cl.
CPC ........ *B23K 26/0676* (2013.01); *B23K 26/364* (2015.10); *B23K 26/402* (2013.01); *B23K 2203/56* (2015.10)

(58) Field of Classification Search
CPC ........ B23K 26/06; B23K 26/36; B23K 26/40; H01L 21/68

USPC ........... 219/121.68, 121.69, 121.61; 438/463
See application file for complete search history.

(56) References Cited

U.S. PATENT DOCUMENTS 6,667,830 B1* 12/2003 Iketaki ................. G01N 21/636
                                                           250/458.1
7,835,070 B2* 11/2010 Mizuguchi ............... G02B 5/04
                                                           252/584

FOREIGN PATENT DOCUMENTS

JP       2008-114239       5/2008

* cited by examiner

*Primary Examiner* — Samuel M Heinrich
(74) *Attorney, Agent, or Firm* — Greer Burns & Crain Ltd.

(57) ABSTRACT

A laser machining apparatus has a laser beam irradiation unit that includes: a pulsed laser oscillator that oscillates a pulsed laser beam at a given repetition frequency; first and second condensers that collect the pulsed laser beam oscillated by the pulsed laser oscillator; and a beam splitting unit arranged between the pulsed laser oscillator and the first and second condensers to split the pulsed laser beam oscillated by the pulsed laser oscillator and direct the resultant beams alternately toward the first and second condensers. The beam splitting unit includes a photoelastic modulator that has a piezo element and a synthetic quartz formed in one piece and modulates the laser beam so that a polarization plane of the laser beam is alternately at 0 and 90 degrees by applying, to the piezo element, a high frequency voltage at a frequency that matches the natural frequency of the synthetic quartz.

5 Claims, 3 Drawing Sheets

LASER MACHINING APPARATUS

BACKGROUND OF THE INVENTION

Field of the Invention

The present invention relates to a laser machining apparatus for laser-machining a workpiece such as a semiconductor wafer.

Description of the Related Art

In a semiconductor device manufacturing process, the surface of an approximately disk-shaped semiconductor wafer is partitioned into a plurality of areas by scheduled division lines that are formed in a grid pattern, with a device such as IC or LSI formed in each of the partitioned areas. Then, a semiconductor wafer is cut along scheduled division lines, thus dividing the wafer into areas, each having a device formed therein and manufacturing individual device chips. An optical device wafer having light-receiving elements such as photodiodes or light-emitting elements such as laser diodes stacked on the surface of a sapphire substrate is similarly cut along scheduled division lines, thus dividing the wafer into individual optical devices such as photodiodes or laser diodes for application to a wide range of electronic equipment.

In order to divide a wafer such as semiconductor wafer or optical device wafer along scheduled division lines as described above, a method has been proposed which forms laser-machined grooves by irradiating a pulsed laser beam at a wavelength that is absorbed by the wafer along scheduled division lines and breaking the wafer along the scheduled division lines where the laser-machined grooves are formed. A laser machining apparatus for performing such laser machining includes chuck table, laser beam irradiation means, and machining feed means. The chuck table holds a workpiece. The laser beam irradiation means laser-machines the workpiece held by the chuck table. The machining feed means moves the chuck table and the laser beam irradiation means relatively in the machining feed direction. Then, the laser beam irradiation means includes laser beam oscillation means and a condenser. The laser beam oscillation means oscillates a laser beam. The condenser includes a condenser lens adapted to collect the laser beam oscillated by the laser beam oscillation means and irradiate the beam onto the workpiece held by the chuck table.

Further, a laser machining apparatus has been proposed which permits two kinds of laser machining by splitting a pulsed laser beam, oscillated by laser beam oscillation means, into two paths using a polarization beam splitter (for example, Japanese Patent Laid-Open No. 2008-114239).

SUMMARY OF THE INVENTION

However, splitting a pulsed laser beam into two paths using a polarization beam splitter results in half the power density for each pulsed laser beam, inhibiting proper machining due to insufficient output.

In order to solve such a problem, a technique has been proposed which splits a pulsed laser beam every pulse in synchronism with the repetition frequency of the pulsed laser beam using an electro optical modulator (EOM) or accousto optical modulator (AOM). However, the EOM and AOM both suffer a decline in output by 15 to 30% due to low transmittance. Moreover, the EOM and AOM transmit a laser beam with a relatively high density. The reason for this is that it is necessary to reduce the beam diameter because of a small effective diameter of several millimeters for receiving a laser beam. This leads to a deviation of the focal point due to thermal lens effect and causes significant damage, thus resulting in a short life of the condenser.

In light of the foregoing, it is an object of the present invention to provide a laser machining apparatus which permits machining with no reduction in power density of each pulsed laser beam even when the pulsed laser beam is split into two paths.

In accordance with an aspect of the present invention, there is provided a laser machining apparatus which includes chuck table and laser beam irradiation means. The chuck table holds a workpiece. The laser beam irradiation means irradiates the workpiece held by the chuck table with a laser beam. The laser beam irradiation means includes a pulsed laser oscillator, first and second condensers, and beam splitting means. The pulsed laser oscillator oscillates a pulsed laser beam at a given repetition frequency. The first and second condensers collect the pulsed laser beam oscillated by the pulsed laser oscillator. The beam splitting means is arranged between the pulsed laser oscillator and the first and second condensers, and splits the pulsed laser beam oscillated by the pulsed laser oscillator, and directs the resultant beams alternately toward the first and second condensers. The beam splitting means includes a photoelastic modulator that has a piezo element and a synthetic quartz formed in one piece. The photoelastic modulator modulates the laser beam so that a polarization plane of the laser beam is alternately at 0 and 90 degrees by applying, to the piezo element, a high frequency voltage at a frequency that matches the natural frequency of the synthetic quartz.

Preferably, the beam splitting means includes, from a side of the pulsed laser oscillator toward a side of the first and second condensers, a first half wavelength plate, a photoelastic modulator, a second half wavelength plate, and a polarization beam splitter. When the frequency of the photoelastic modulator is denoted by $f_{PEM}$, the repetition frequency of the pulsed laser oscillator by $f_{Laser}$, and a natural number by m, the repetition frequency $f_{Laser}$ is found by the following formula:

$$f_{Laser} = \frac{4 f_{PEM}}{(2m+1)} [Hz]$$

Preferably, the natural frequency of the synthetic quartz is 50 kHz. Substituting $f_{PEM}$=50 kHz and m=0, 1, 2, 3, 4 and so on, the repetition frequency $f_{Laser}$ of the pulsed laser oscillator is found as $f_{Laser}$=200 kHz, 40 kHz, 8 kHz, 1.6 kHz, 320 Hz, and 64 Hz.

Preferably, the beam splitting means includes, from the side of the pulsed laser oscillator toward the side of the first and second condensers, a quarter wavelength plate, a photoelastic modulator, a half wavelength plate, and a polarization beam splitter. When the frequency of the photoelastic modulator is denoted by $f_{PEM}$, the repetition frequency of the pulsed laser oscillator by $f_{Laser}$, and a natural number by m, the repetition frequency $f_{Laser}$ is found by the following formula:

$$f_{Laser} = \frac{2 f_{PEM}}{(2m+1)} [Hz]$$

Preferably, the natural frequency of the synthetic quartz is 50 kHz. Substituting $f_{PEM}$=50 kHz and m=0, 1, 2, 3, 4 and so on, the repetition frequency of the pulsed laser oscillator can be found as $f_{Laser}$=100 kHz, 20 kHz, 4 kHz, 800 Hz, 160 Hz, and 32 Hz.

In the laser machining apparatus of the present invention, the beam splitting means adapted to split a pulsed laser beam and direct the resultant beams alternately toward the first and second condensers includes a photoelastic modulator that has a piezo element and a synthetic quartz formed in one piece. The photoelastic modulator modulates the laser beam so that the polarization plane is alternately at 0 and 90 degrees by applying, to the piezo element, a high frequency voltage at a frequency that matches the natural frequency of the synthetic quartz. This ensures that a pulsed laser beam is modulated alternately every pulse in synchronism with the repetition frequency of the pulsed laser beam oscillated by the pulsed later oscillator, thus preventing reduction of energy density of each pulse to one half. This makes it possible to machine a workpiece simultaneously and properly using pulsed laser beams split by the beam splitting means and directed alternately toward the first and second condensers.

Further, the synthetic quartz making up the photoelastic modulator has high transmittance and, therefore, the photoelastic modulator does not decline in output by 15 to 30% as to electro optical modulator (EOM) and accousto optical modulator (AOM). Moreover, the effective diameter for receiving a laser beam is large or about 16 mm, thus allowing for transmission of a laser beam with a relatively low density. This prevents thermal lens effect, thus eliminating the problems of a deviation of the focal point and a short life of the condenser.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
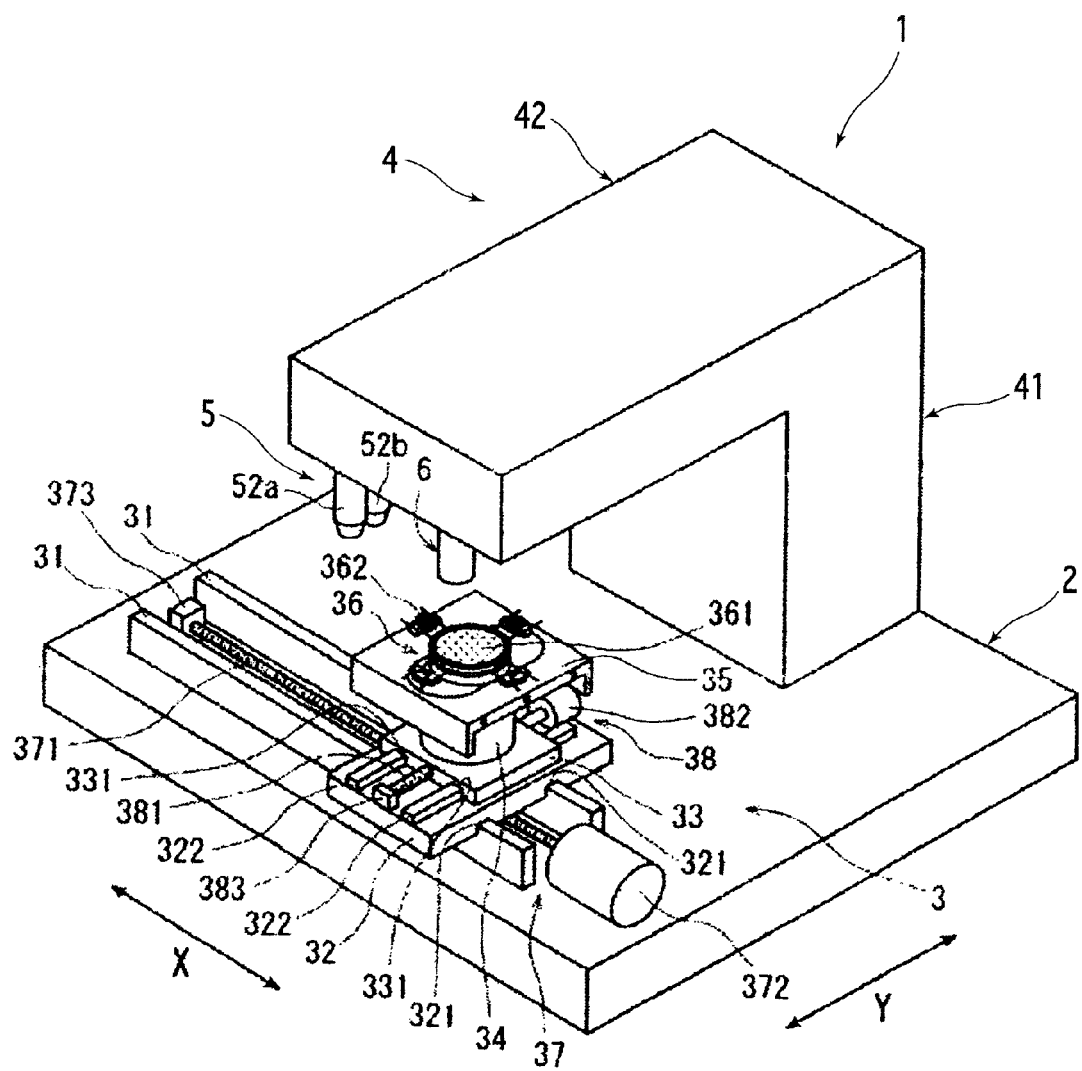
FIG. 1 is a perspective view of a laser machining apparatus configured according to the present invention.

A detailed description will be given below of preferred embodiments of a wafer machining method and a laser machining apparatus according to the present invention with reference to the accompanying drawings. FIG. 1 illustrates a perspective view of a laser machining apparatus 1 configured according to the present invention. The laser machining apparatus 1 illustrated in FIG. 1 includes a stationary base 2, a chuck table mechanism 3, and a laser beam irradiation unit 4 that is arranged on the stationary base 2 and serving as laser beam irradiation means. The chuck table mechanism 3 holds a workpiece that is arranged on the stationary base 2 in a manner movable in the machining feed direction (X-axis direction) shown by an arrow X on the stationary base 2.

The chuck table mechanism 3 includes a pair of guide rails 31, first and second sliding blocks 32 and 33, a support table 35, and a chuck table 36. The guide rails 31 are arranged on the stationary base 2 to be parallel to each other along the X-axis direction. The first sliding block 32 is arranged on the guide rails 31 in a manner movable in the X-axis direction. The second sliding block 33 is arranged on the first sliding block 32 in a manner movable in the indexing feed direction (Y-axis direction) orthogonal to the X-axis direction. The support table 35 is supported on the second sliding block 33 by a cylindrical member 34. The chuck table 36 serves as chuck table. The chuck table 36 includes a suction chuck 361 that is formed with a porous material. A workpiece such as circular semiconductor wafer is held on the holding face, i.e., the top face, of the suction chuck 361 by unshown sucking means. The chuck table 36 configured as described above is rotated by an unshown pulse motor that is arranged inside the cylindrical member 34. It should be noted that a clamp 362 is arranged on the chuck table 36 to fasten an annular frame that supports the workpiece such as semiconductor wafer via a protective tape.

The first sliding block 32 has, on the bottom face, a pair of guided grooves 321 which fit over the pair of guide rails 31 and, on the top face, a pair of guide rails 322 that are formed parallel along the Y-axis direction. The first sliding block 32 configured as described above can move in the X-axis direction along the pair of guide rails 31 as the guided grooves 321 fit over the pair of guide rails 31. The chuck table mechanism 3 includes machining feed means 37 adapted to move the first sliding block 32 in the X-axis direction along the pair of guide rails 31. The machining feed means 37 includes a male threaded rod 371 and a driving source such as a pulse motor 372. The male threaded rod 371 is arranged parallel to and between the pair of guide rails 31. The pulse motor 372 rotates and drives the male threaded rod 371. The male threaded rod 371 has its one end supported in a freely rotatable manner by a bearing block 373 that is fastened to the stationary base 2 and its other end coupled to the output shaft of the pulse motor 372 for power transmission. It should be noted that the male threaded rod 371 is screwed into a female threaded through hole formed in a female threaded block that is not shown. The female threaded block is provided to protrude on the bottom face of the center portion of the first sliding block 32. Therefore, as the male threaded rod 371 is rotated in normal and reverse directions by the pulse motor 372, the first sliding block 32 moves in the X-axis direction along the guide rails 31.

The second sliding block 33 has, on the bottom face, a pair of guided grooves 331 which fit over the pair of guide rails 322 provided on the top face of the first sliding block 32. As the guided grooves 331 fit over the pair of guide rails 322, the second sliding block 33 can move in the Y-axis direction. The chuck table mechanism 3 includes indexing feed means 38 adapted to move the second sliding block 33 in the Y-axis direction along the pair of guide rails 322 provided on the first sliding block 32. The indexing feed means 38 includes a male threaded rod 381 and a driving source such as a pulse motor 382. The male threaded rod 381 is arranged parallel to and between the pair of guide rails 322. The pulse motor 382 rotates and drives the male threaded rod 381. The male threaded rod 381 has its one end supported in a freely rotatable manner by a bearing block 383 that is fastened to the top face of the first sliding block 32 and its other end coupled to the output shaft of the pulse motor 382 for power transmission. It should be noted that the male threaded rod 381 is screwed into a female threaded through hole formed in a female threaded block that is not shown. The female threaded block is provided to protrude on the bottom face of the center portion of the second sliding block 33. Therefore, as the male threaded rod 381 is rotated in normal and reverse directions by the pulse motor 382, the second sliding block 33 moves in the Y-axis direction along the guide rails 322.

The laser beam irradiation unit 4 includes a support member 41, a casing 42, laser beam irradiation means 5, and imaging means 6. The support member 41 is arranged on the stationary base 2. The casing 42 is supported by the support member 41 and extends substantially horizontally. The laser beam irradiation means 5 is arranged on the casing 42. The imaging means 6 is arranged on the front end portion of the casing 42 to detect an area to be laser-machined. It should be noted that the imaging means 6 includes, in addition to an ordinary imaging element (CCD) adapted to capture an image using visible light, infrared illumination means, an optics, another imaging element (infrared CCD), and so on in the illustrated embodiment. The infrared illumination means irradiates infrared light onto a workpiece. The optics captures infrared light irradiated by the infrared illumination means. The imaging element (infrared CCD) outputs an electric signal proportional to infrared light captured by the optics. The imaging means 6 transmits the captured image signal to control means which is not shown.

Figure 2:
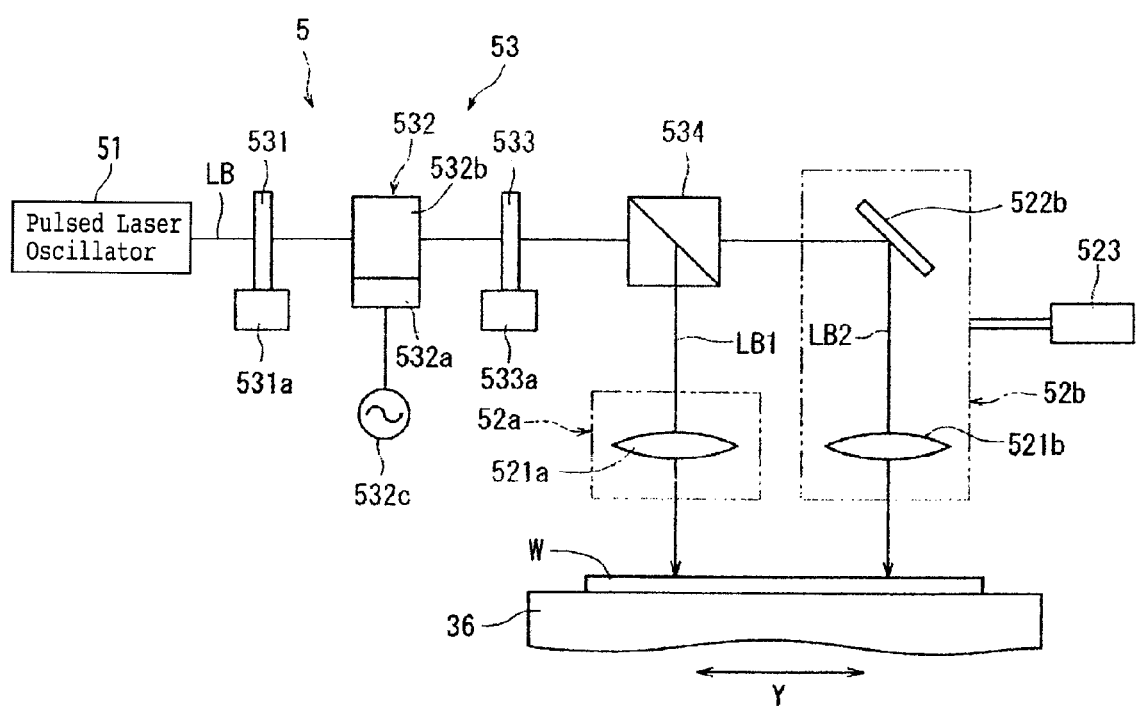
FIG. 2 is a block configuration diagram of laser beam irradiation means included in the laser machining apparatus shown in FIG. 1.

A description will be given of the laser beam irradiation means 5 with reference to FIG. 2. The laser beam irradiation means 5 illustrated in FIG. 2 includes a pulsed laser oscillator 51, first and second condensers 52a and 52b, and beam splitting means 53. The pulsed laser oscillator 51 oscillates a pulsed laser beam at a given repetition frequency. The first and second condensers 52a and 52b collect the pulsed laser beam oscillated by the pulsed laser oscillator 51 and irradiates the pulsed laser beam onto a workpiece W held by the chuck table 36. The beam splitting means 53 is arranged between the pulsed laser oscillator 51 and the first and second condensers 52a and 52b and splits the pulsed laser beam oscillated by the pulsed laser oscillator 51 and directs the resultant beams alternately toward the first and second condensers 52a and 52b. In the present embodiment, the pulsed laser oscillator 51 oscillates pulsed laser beams LB at repetition frequencies of 200 kHz, 40 kHz, 8 kHz, 1.6 kHz, 320 Hz, and 64 Hz because of the reason which will be described later.

In the present embodiment, the beam splitting means 53 includes, from the side of the pulsed laser oscillator 51 toward the side of the first and second condensers 52a and 52b, a first half wavelength plate 531, a photoelastic modulator 532, a second half wavelength plate 533, and a polarization beam splitter 534. The first half wavelength plate 531 rotates the polarization plane of the pulsed laser beam LB oscillated by the pulsed laser oscillator 51, thus adjusting the polarization plane so that the pulsed laser beam LB is incident upon the photoelastic modulator 532 at an appropriate angle. It should be noted that the first half wavelength plate 531 is rotated by an actuator 531a such as pulse motor.

In the present embodiment, the photoelastic modulator 532 has a piezo element 532a and synthetic quartz 532b formed in one piece. The photoelastic modulator 532 modulates the pulsed laser beam oscillated by the pulsed laser oscillator 51 so that the polarization plane is alternately at 0 and 90 degrees by applying, to the piezo element 532a, a high frequency voltage at a frequency that matches the natural frequency of the synthetic quartz 532b. In the photoelastic modulator 532 of the present embodiment, the natural frequency of the synthetic quartz 532b is 50 kHz. As a result, a high frequency voltage at 50 kHz is applied to the piezo element 532a from a high frequency power supply 532c. Therefore, the photoelastic modulator 532 modulates the pulsed laser beam LB alternately every pulse in synchronism with the repetition frequency of the pulsed laser beam LB oscillated by the pulsed later oscillator 51 (modulates the pulsed laser beam LB alternately into S and P waves relative to the polarization beam splitter 534).

The second half wavelength plate 533 rotates the polarization plane of the pulsed laser beam LB that has been modulated by the photoelastic modulator 532 so that the polarization plane is alternately at 0 and 90 degrees, thus adjusting the polarization plane so that the pulsed laser beam LB is incident upon the polarization beam splitter 534 at an appropriate angle. It should be noted that the second half wavelength plate 533 is rotated by an actuator 533a such as a pulse motor.

The polarization beam splitter 534 splits the pulsed laser beam LB incident via the second half wavelength plate 533 into pulsed laser beams LB1 and LB2 and directs the pulsed laser beam LB1 toward the first condenser 52a and the pulsed laser beam LB2 toward the second condenser 52b. The pulsed laser beam LB1 is made up of S waves, and the pulsed laser beam LB2 is made up of P waves.

The first condenser 52a includes a condenser lens 521a. The condenser lens 521a collects the pulsed laser beam LB1, split by the polarization beam splitter 534 and made up of S waves, irradiating the pulsed laser beam LB1 onto the workpiece W held by the chuck table 36. On the other hand, the second condenser 52b includes a direction change mirror 522b and a condenser lens 521b. The direction change mirror 522b changes the direction of the pulsed laser beam LB2, split by the polarization beam splitter 534 and made up of P waves, directing the pulsed laser beam LB2 toward the holding face of the chuck table 36. The condenser lens 521b collects the pulsed laser beam LB2 whose direction has been changed by the direction change mirror 522b, irradiating the pulsed laser beam LB2 onto the workpiece W held by the chuck table 36. It should be noted that the second condenser 52b is arranged at a distance from the first condenser 52a in the Y-axis direction in the illustrated embodiment, and that the second condenser 52b can be adjusted by movement means 523 to move in the Y-axis direction. The first and second condensers 52a and 52b configured as described above are attached to the tip of the casing 42 as illustrated in FIG. 1.

The laser beam irradiation means 5 is configured as described above, and a description will be given of the setting of the repetition frequency of the pulsed laser oscillator 51. When the frequency of the photoelastic modulator 532 is denoted by $f_{PEM}$, the repetition frequency of the pulsed laser oscillator 51 by $f_{Laser}$, and a natural number by m, the repetition frequency can be found by formula 1 shown below:

$$f_{Laser} = \frac{4 f_{PEM}}{(2m+1)} [Hz] \quad \text{[Formula 1]}$$

The natural frequency of the synthetic quartz 532b making up the photoelastic modulator 532 is 50 kHz. Substituting $f_{PEM}$=50 kHz and m=0, 1, 2, 3, 4 and so on, the repetition frequency $f_{Laser}$ of the pulsed laser oscillator 51 is found as $f_{Laser}$=200 kHz, 40 kHz, 8 kHz, 1.6 kHz, 320 Hz, and 64 Hz.

The beam splitting means 53 of the laser beam irradiation means 5 configured as described above modulates the pulsed laser beam oscillated by the pulsed laser oscillator 51 so that the polarization plane is alternately at 0 and 90 degrees by applying, to the piezo element 532a of the photoelastic modulator 532 having the piezo element 532a and the synthetic quartz 532b formed in one piece, a high frequency voltage at a frequency that matches the natural frequency of the synthetic quartz 532b. This ensures that a pulsed laser beam is modulated alternately every pulse in synchronism with the repetition frequency of the pulsed laser beam oscillated by the pulsed later oscillator 51 (the pulsed laser beam is modulated alternately into S and P waves relative to the polarization beam splitter 534), thus preventing reduction of energy density of each pulse to one half. This makes it possible to machine a workpiece simultaneously and properly using the pulsed laser beams LB1 and LB2, the pulsed laser beam LB1 made up of S waves and the pulsed laser beam LB2 made up of P waves, split by the polarization beam splitter 534 of the beam splitting means 53 and directed alternately toward the first and second condensers 52a and 52b.

Further, the synthetic quartz 532b making up the photoelastic modulator 532 has high transmittance and, therefore, the photoelastic modulator 532 does not decline in output by 15 to 30% as do electro optical modulator (EOM) and accousto optical modulator (AOM). Moreover, the effective diameter for receiving a laser beam is large or about 16 mm, thus allowing for transmission of a laser beam with a relatively low density. This prevents thermal lens effect, thus eliminating the problems of a deviation of the focal point and a short life of the condenser.

A description will be given next of another embodiment of the laser beam irradiation means with reference to FIG. 3. Laser beam irradiation means 50 illustrated in FIG. 3 includes a quarter wavelength plate 535 in place of the first half wavelength plate 531 making up the beam splitting means 53 of the laser beam irradiation means 5, with the quarter wavelength plate 535 rotated by an actuator 535a such as pulse motor. Other components are substantially the same. Therefore, the same components are denoted by the same reference numerals, and the description thereof is omitted.

Figure 3:
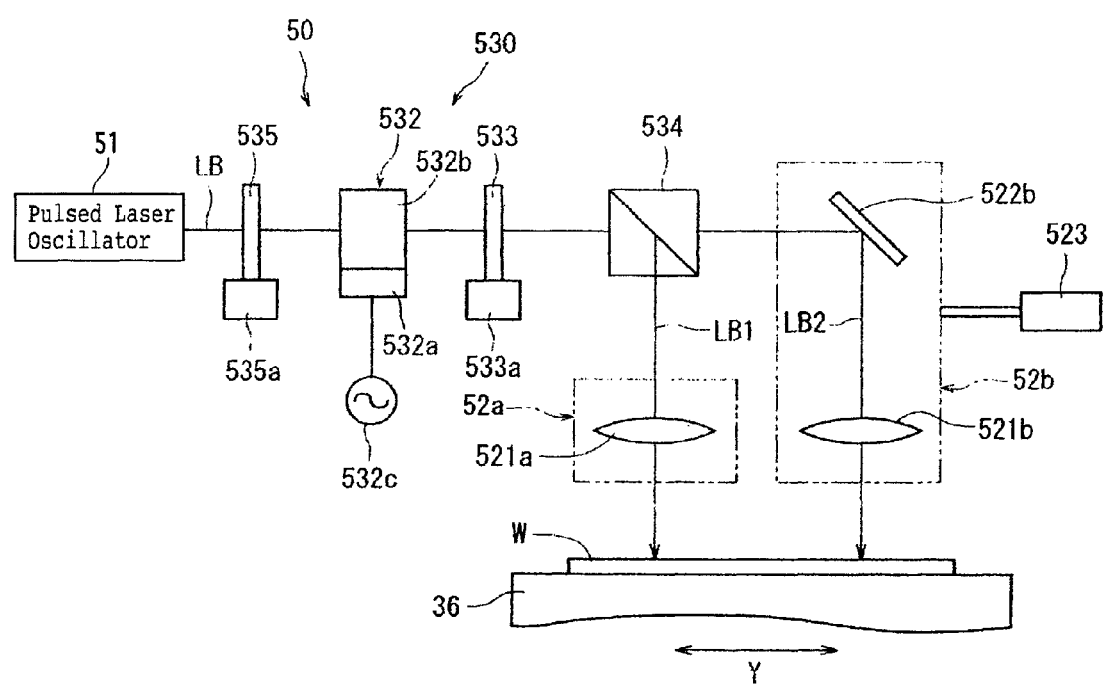
FIG. 3 is a block configuration diagram illustrating another embodiment of the laser beam irradiation means included in the laser machining apparatus shown in FIG. 1.

The quarter wavelength plate 535 making up beam splitting means 530 of the laser beam irradiation means 50 illustrated in FIG. 3 changes the linear polarization pulsed laser beam LB, oscillated by the pulsed laser oscillator 51, to circular polarization. The pulsed laser beam LB that has been changed to circular polarization as described above is guided to the synthetic quartz 532b of the photoelastic modulator 532 as with the beam splitting means 53 of the laser beam irradiation means 5. The pulsed laser beam LB is split, causing the resultant beams to be directed alternately toward the first and second condensers 52a and 52b as with the beam splitting means 53 of the laser beam irradiation means 5.

A description will be given next of the setting of the repetition frequency of the pulsed laser oscillator 51 making up the laser beam irradiation means 50 in the embodiment illustrated in FIG. 3. When the frequency of the photoelastic modulator 532 is denoted by $f_{PEM}$, the repetition frequency of the pulsed laser oscillator 51 by $f_{Laser}$, and a natural number by m, the repetition frequency $f_{Laser}$ of the pulsed laser oscillator 51 can be found by formula 2 shown below:

$$f_{Laser} = \frac{2 f_{PEM}}{(2m+1)} [\text{Hz}] \quad [\text{Formula 2}]$$

The natural frequency of the synthetic quartz 532b making up the photoelastic modulator 532 is 50 kHz. Substituting $f_{PEM}$=50 kHz and m=0, 1, 2, 3, 4 and so on, the repetition frequency $f_{Laser}$ of the pulsed laser oscillator 51 is found as $f_{Laser}$=100 kHz, 20 kHz, 4 kHz, 800 Hz, 160 Hz, and 32 Hz.

Therefore, the pulsed laser oscillator 51 making up the laser beam irradiation means 50 in the embodiment illustrated in FIG. 3 oscillates the pulsed laser beams LB at repetition frequencies of 100 kHz, 20 kHz, 4 kHz, 800 Hz, 160 Hz, and 32 Hz. The laser beam irradiation means 50 configured as described above provides the same advantageous effects as does the laser beam irradiation means 5 illustrated in FIG. 2.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser machining apparatus comprising:
chuck table operable to hold a workpiece; and
laser beam irradiation means operable to irradiate the workpiece held by the chuck table with a laser beam, the laser beam irradiation means including
a pulsed laser oscillator adapted to oscillate a pulsed laser beam at a given repetition frequency,
first and second condensers adapted to collect the pulsed laser beam oscillated by the pulsed laser oscillator, and
beam splitting means arranged between the pulsed laser oscillator and the first and second condensers to split the pulsed laser beam oscillated by the pulsed laser oscillator and direct the resultant beams alternately toward the first and second condensers,
the beam splitting means including a photoelastic modulator that has a piezo element and synthetic quartz formed in one piece and modulates the laser beam so that a polarization plane of the laser beam is alternately at 0 and 90 degrees by applying, to the piezo element, a high frequency voltage at a frequency that matches the natural frequency of the synthetic quartz.

2. The laser machining apparatus of claim 1, wherein the beam splitting means includes, from a side of the pulsed laser oscillator toward a side of the first and second condensers
a first half wavelength plate,
a photoelastic modulator,
a second half wavelength plate, and
a polarization beam splitter, and wherein
when the frequency of the photoelastic modulator is denoted by $f_{PEM}$, the repetition frequency of the pulsed laser oscillator by $f_{Laser}$, and a natural number by m, the repetition frequency $f_{Laser}$ is found by the following formula:

$$f_{Laser} = \frac{4 f_{PEM}}{(2m+1)} [\text{Hz}].$$

3. The laser machining apparatus of claim 2, wherein the natural frequency of a synthetic quartz is 50 kHz, and wherein
when $f_{PEM}$=50 kHz and m=0, 1, 2, 3, 4 and so on are substituted, the repetition frequency of the pulsed laser oscillator is found as $f_{Laser}$=200 kHz, 40 kHz, 8 kHz, 1.6 kHz, 320 Hz, and 64 Hz.

4. The laser machining apparatus of claim 1, wherein the beam splitting means includes, from a side of the pulsed laser oscillator toward a side of the first and second condensers a quarter wavelength plate, a photoelastic modulator, a half wavelength plate, and a polarization beam splitter, and wherein when the frequency of the photoelastic modulator is denoted by $f_{PEM}$, the repetition frequency of the pulsed laser oscillator by $f_{Laser}$, and a natural number by m, the repetition frequency $f_{Laser}$ is found by the following formula:

$$f_{Laser} = \frac{2 f_{PEM}}{(2m+1)} [Hz].$$

5. The laser machining apparatus of claim 4, wherein the natural frequency of a synthetic quartz is 50 kHz, and wherein when $f_{PEM}$=50 kHz and m=0, 1, 2, 3, 4 and so on are substituted, the repetition frequency of the pulsed laser oscillator is found as $f_{Laser}$=100 kHz, 20 kHz, 4 kHz, 800 Hz, 160 Hz, and 32 Hz.

\* \* \* \* \*